United States Patent
Sato

(10) Patent No.: US 11,265,425 B2
(45) Date of Patent: Mar. 1, 2022

(54) PRINTING APPARATUS THAT COMMUNICATES WITH A DNS SERVER, CONTROL METHOD THEREOF, AND PROGRAM STORAGE MEDIUM

(71) Applicant: CANON KABUSHIKI KAISHA, Tokyo (JP)

(72) Inventor: Haruki Sato, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/922,402

(22) Filed: Jul. 7, 2020

(65) Prior Publication Data

US 2021/0021717 A1 Jan. 21, 2021

(30) Foreign Application Priority Data

Jul. 16, 2019 (JP) .............................. JP2019-131492

(51) Int. Cl.
*H04N 1/00* (2006.01)
*H04L 67/00* (2022.01)

(52) U.S. Cl.
CPC ......... *H04N 1/00204* (2013.01); *H04L 67/34* (2013.01); *H04N 1/00891* (2013.01); *H04N 1/00896* (2013.01)

(58) Field of Classification Search
None
See application file for complete search history.

(56) References Cited

U.S. PATENT DOCUMENTS

| 10,635,366 B2 | 4/2020 | Iwauchi | |
|---|---|---|---|
| 2010/0306409 A1* | 12/2010 | Jansen | H04L 61/609 709/245 |
| 2010/0306410 A1* | 12/2010 | Jansen | H04L 67/16 709/245 |
| 2011/0064076 A1* | 3/2011 | Matsuo | H04L 69/167 370/389 |
| 2018/0060000 A1* | 3/2018 | Iwauchi | H04N 1/00251 |

FOREIGN PATENT DOCUMENTS

JP     2016018283 A     2/2016

* cited by examiner

*Primary Examiner* — Mohammad H Ghayour
*Assistant Examiner* — Pawan Dhingra
(74) *Attorney, Agent, or Firm* — Rossi, Kimms & McDowell LLP

(57) ABSTRACT

An MFP communicates with a DNS server through a network. This MFP includes an operation unit that sets whether a printing service is activated or not and a controller unit that registers search information in which capability information provided for a client terminal and information relating to name resolution are associated with each other in the DNS server in accordance with activation of the printing service being set by this operation unit.

7 Claims, 20 Drawing Sheets

FIG. 10

| | | |
|---|---|---|
| 1002 | rp | ipp/print |
| 1003 | ty | CaNOn Printer 1234 |
| | product | CaNOn Printer 1234 |
| | NOte | Tokyo Office |
| 1004 | adminurl | http://Printer-A.example.com:80/c_tcpip_setting.html |
| | pdl | application/octet-stream,application/pdf,image/jpeg,image/urf,image/pwg-raster |
| | Color | T |
| | Copies | T |
| | Duplex | T |
| | Bind | F |
| | Collate | F |
| | Sort | F |
| | Staple | F |
| | Punch | 0 |
| 1005 | Service Type | _ipp._tcp |

Domain Name System (query)
    Transaction ID: 0x21eb
    Flags: 0x2800 Dynamic update
    Zones: 1
    Prerequisites: 0
    Updates: 4
    Additional RRs: 0
    Zone
    example.com: type SOA, class IN
        Name: example.com
        [Name Length: 12]
        [Label Count: 1]
        Type: SOA (START Of a zone of Authority) (6)
        Class: IN (0x0001)
    Updates 1202
    Printer-A.example.com.: type A, class IN, addr 10.20.20.20
        Name: Printer-A.example.com.
        Type: A (Host Address) (1)
        Class: IN (0x0001)
        Time to live: 150
        Data length: 4
        Address: 10.20.20.20

1203
    _ipp._tcp.example.com.: type PTR, class IN, Printer-A._ipp._tcp.example.com.
        Name: _ipp._tcp.example.com.
        Type: PTR (domain name PoinTeR) (12)
        Class: IN (0x0001)
        Time to live: 150
        Data length: 21
        Domain Name: Printer-A._ipp._tcp.example.com.

1204
    Printer-A._ipp._tcp.example.com.: type SRV, class IN, priority 0, weight 0, port 631,
    target Printer-A.example.com.
        Name: Printer-A._ipp._tcp.example.com.
        Type: SRV (Server Selection) (33)
        Class: IN (0x0001)
        Data length: 23
        Priority: 0
        Weight: 0
        Port: 631
        Target: Printer-A.example.com.

FIG. 13

1205 {
```
Printer-A.example.com.: type TXT, class IN
   Name: Printer-A.example.com
   Type: TXT (Text strings) (16)
   Class: IN (0x0001)
   Time to live: 150
   Data length: 330
   TXT Length: 9
   TXT:txtvers=1
   TXT Length: 12
   TXT:rp=ipp/print
   TXT Length: 12
   TXT:ty=CaNOn Printer 1234
   TXT Length: 56
   TXT:adminurl=http://Printer-A.example.com:80/c_tcpip_setting.html
   TXT Length: 17
   TXT:NOte=Tokyo Office
   TXT Length: 11
   TXT:priority=10
   TXT Length: 17
   TXT:product=CaNOn Printer 1234
   TXT Length: 7
   TXT:Color=T
   TXT Length: 8
   TXT:Duplex=T
   TXT Length: 8
   TXT:Staple=F
   TXT Length: 8
   TXT:Copies=T
   TXT Length: 9
   TXT:Collate=F
   TXT Length: 7
   TXT:Punch=O
   TXT Length: 6
   TXT:Bind=F
   TXT Length: 6
   TXT:Sort=F
   TXT Length: 82
   TXT:pdl=application/octet-stream,application/pdf,image/jpeg,image/urf,image/pwg-raster
```

```
Domain Name System (query)
    Transaction ID: 0x21eb
    Flags: 0x2800 Dynamic update
    Zones: 1
    Prerequisites: 0
    Updates: 1
    Additional RRs: 0
    Zone
    example.com: type SOA, class IN
        Name: example.com
        [Name Length: 12]
        [Label Count: 1]
        Type: SOA (START Of a zone of Authority) (6)
        Class: IN (0x0001)
    Updates
    Printer-A.example.com.: type A, class IN, addr 10.20.20.20
        Name: Printer-A.example.com.
        Type: A (Host Address) (1)
        Class: IN (0x0001)
        Time to live: 150
        Data length: 4
        Address: 10.20.20.20
```

Domain Name System (query)
    Transaction ID: 0x21eb
    Flags: 0x2800 Dynamic update
    Zones: 1
    Prerequisites: 0
    Updates: 4
    Additional RRs: 0
    Zone
    example.com: type SOA, class IN
        Name: example.com
        Type: SOA (START Of a zone of Authority) (6)
        Class: IN (0x0001)
    Updates
    Printer-A.example.com.: type A, class ANY
        Name: Printer-A.example.com.
        Type: A (Host Address) (1)
        Class: ANY (0x00ff)
        Time to live: 0
        Data length: 0
    _ipp._tcp.example.com.: type PTR, class ANY
        Name: _ipp._tcp.example.com.
        Type: PTR (domain name PoinTeR) (12)
        Class: ANY (0x00ff)
        Time to live: 0
        Data length: 0
    Printer-A._ipp._tcp.example.com.: type SRV, class ANY
        Name: Printer-A._ipp._tcp.example.com.
        Type: SRV (Server Selection) (33)
        Class: ANY (0x00ff)
        Time to live: 0
        Data length: 0
    Printer-A.example.com.: type TXT, class ANY
        Name: Printer-A.example.com
        Type: TXT (Text strings) (16)
        Class: ANY (0x00ff)
        Time to live: 0
        Data length: 0

Domain Name System (query)
    Transaction ID: 0x21eb
    Flags: 0x2800 Dynamic update
    Zones: 1
    Prerequisites: 0
    Updates: 3
    Additional RRs: 0
    Zone
    example.com: type SOA, class IN
        Name: example.com
        Type: SOA (START Of a zone of Authority) (6)
        Class: IN (0x0001)
    Updates
    _ipp._tcp.example.com.: type PTR, class ANY
        Name: _ipp._tcp.example.com.
        Type: PTR (domain name PoinTeR) (12)
        Class: ANY (0x00ff)
        Time to live: 0
        Data length: 0
    Printer-A._ipp._tcp.example.com.: type SRV, class ANY
        Name: Printer-A._ipp._tcp.example.com.
        Type: SRV (Server Selection) (33)
        Class: ANY (0x00ff)
        Time to live: 0
        Data length: 0
    Printer-A.example.com.: type TXT, class ANY
        Name: Printer-A.example.com
        Type: TXT (Text strings) (16)
        Class: ANY (0x00ff)
        Time to live: 0
        Data length: 0

PRINTING APPARATUS THAT COMMUNICATES WITH A DNS SERVER, CONTROL METHOD THEREOF, AND PROGRAM STORAGE MEDIUM

BACKGROUND OF THE INVENTION

Field of the Invention

The present invention relates to a printing apparatus communicating with a DNS server, a control method, and a program storage medium.

Description of the Related Art

Conventionally, a system in which external terminal devices such as a personal computer (PC) and a mobile terminal are connected to a printing apparatus such as a multi function peripheral (MFP) or a printer through a network is known. By using such a system, for example, a service for transmitting image information to a printing apparatus and printing the image information can be provided for a terminal device.

As such a system, a system in which a terminal device is allowed to search available printing apparatuses in a case in which a plurality of printing apparatuses are connected to a network is known.

Such a search process, for example, can be performed using a network service search protocol such as a multicast domain name service (mDNS). In the mDNS, a search packet designating a printing service that is a search target is transmitted using multi cast from the terminal device to each printing apparatus. In a case in which a printing service designated by this search packet is supported, each printing apparatus returns a response packet. When an available printing apparatus is found, the terminal device acquires an IP address of the printing apparatus and transmits print data to the IP address as a destination.

Meanwhile, as another technology for providing a printing service for a terminal device, a technology using both near field communication and a high speed network has been proposed (see Japanese Patent Laid-Open No. 2016-018283). In this technology, first, from a printing apparatus to the terminal device, communication information including an IP address of the printing apparatus is transmitted using near field communication. Then, the terminal device transmits print data by accessing the printing apparatus through a high speed network using the received communication information.

As yet another technology for providing a printing service for a terminal device, a technology called DNS service discovery (DNS SD) is known. The DNS SD enables a search for services on a network using a domain name service (DNS) packet.

In this DNS SD, first, a terminal device requests a DNS server to search for devices providing a desired service by transmitting a request packet through a network. The DNS server searches for devices satisfying this request and resolves host names and IP addresses of corresponding devices. Then, the DNS server returns a result of the resolution to the terminal device as a response packet. In this way, the terminal can find services and devices provided on a network without knowing a host name and an IP address in advance.

In a case in which the mDNS described above is used, multicast transmission of packets can be constantly performed within a subnetwork to which the terminal device is connected. However, in a case in which the subnetwork to which the terminal device is connected is connected to an external subnetwork, in order to perform multicast transmission of packets to the external subnetwork, a gateway corresponding to the mDNS is required. For this reason, in a case in which a printing apparatus connected to the external subnetwork is also configured to provide a printing service, the system may become expensive.

On the other hand, in the technology using the near field communication, both a printing apparatus and a terminal device need to support the near field communication. For this reason, in a case in which this technology is employed, the system may become expensive, and there is limitation on terminal devices that can be used.

SUMMARY OF THE INVENTION

One embodiment of the present invention is a printing apparatus that communicates with a DNS server through a network. The printing apparatus includes at least one memory that stores a set of instructions; and at least one processor that executes the instructions, the instructions, when executed, causing the printing apparatus to perform operations comprising: setting whether a printing service is activated or not as an operation setting of the printing apparatus; and registering search information, in which capability information provided for a client terminal and information relating to name resolution are associated with each other in the DNS server in accordance with activation of the printing service being set as the operation setting of the printing apparatus.

Further features of the present invention will become apparent from the following description of exemplary embodiments with reference to the attached drawings.

BRIEF DESCRIPTION OF THE DRAWINGS

FIG. 10 is IPP printing service information used by a printing apparatus according to an embodiment.

FIG. 12 is a diagram illustrating a DNS registration request packet used by a printing apparatus according to an embodiment.

FIG. 13 is a diagram illustrating a DNS registration request packet used by a printing apparatus according to an embodiment.

FIG. 14 is a diagram illustrating a DNS registration request packet used by a printing apparatus according to an embodiment.

FIG. 16 is a diagram illustrating a DNS registration request packet used by a printing apparatus according to an embodiment.

FIG. 18 is a diagram illustrating a DNS registration request packet used by a printing apparatus according to an embodiment.

DESCRIPTION OF THE EMBODIMENTS

Hereinafter, an embodiment of the present invention will be described with reference to the drawings.

Although a case in which an MFP having a plurality of functions such as a printing function and a copy function is employed as a printing apparatus will be described in this embodiment, the present invention may be also applied to a printing apparatus of a different type (for example, a printing apparatus having a single function or the like). In addition, although an example in which the present invention is applied to a system built inside an office will be described in this embodiment, the present invention may be also applied to a system of a different type as long as the system is built using the Internet or a network of a different type.

Figure 1:
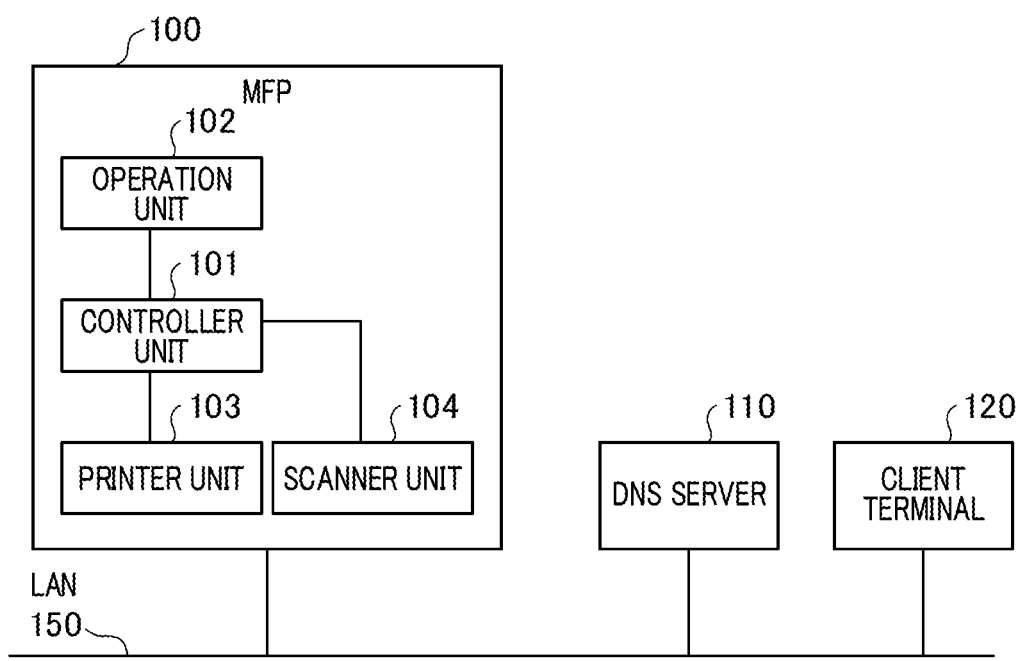
FIG. 1 is a block diagram schematically illustrating the entire configuration of a printing system according to an embodiment of the present invention.

FIG. 1 is a block diagram schematically illustrating the entire configuration of a printing system according to an embodiment. As illustrated in FIG. 1, the system according to this embodiment includes an MFP 100, a DNS server 110, a client terminal 120, and a local area network (LAN) 150.

The MFP 100 includes a controller unit 101, an operation unit 102, a printer unit 103, a scanner unit 104, and the like.

The controller unit 101 is connected to the operation unit 102, the printer unit 103, and the scanner unit 104 and realizes various functions of the MFP 100 by controlling these units.

The operation unit 102 is an input/output device for allowing a user to operate the MFP 100 and includes an input mechanism such as a touch panel and hardware keys and a display mechanism such as a liquid crystal display.

The printer unit 103 prints image data for printing acquired from the controller unit 101 on a sheet such as paper.

The scanner unit 104 generates image data by reading an image from a document such as a sheet of paper and transmits the generated image data to the controller unit 101.

The MFP 100 corresponds to an Internet printing protocol (IPP). For this reason, the MFP 100 can provide a printing service based on print job data received from the client terminal 120 through the LAN 150.

The DNS server 110 is connected to the MFP 100 and the client terminal 120 through the LAN 150. The DNS server 110 performs transmission/reception of a DNS registration packet, a DNS name resolution request packet, a DNS name resolution response packet, a DNS SD request packet, and a DNS SD response packet between the MFP 100 and the client terminal 120.

The client terminal 120 is a terminal device that is operated by a user. In order to receive a printing service using the MFP 100, the user causes the client terminal 120 to transmit the print job data. As the client terminal 120, for example, a general purpose personal computer, a smartphone, or the like can be used.

Figure 2:
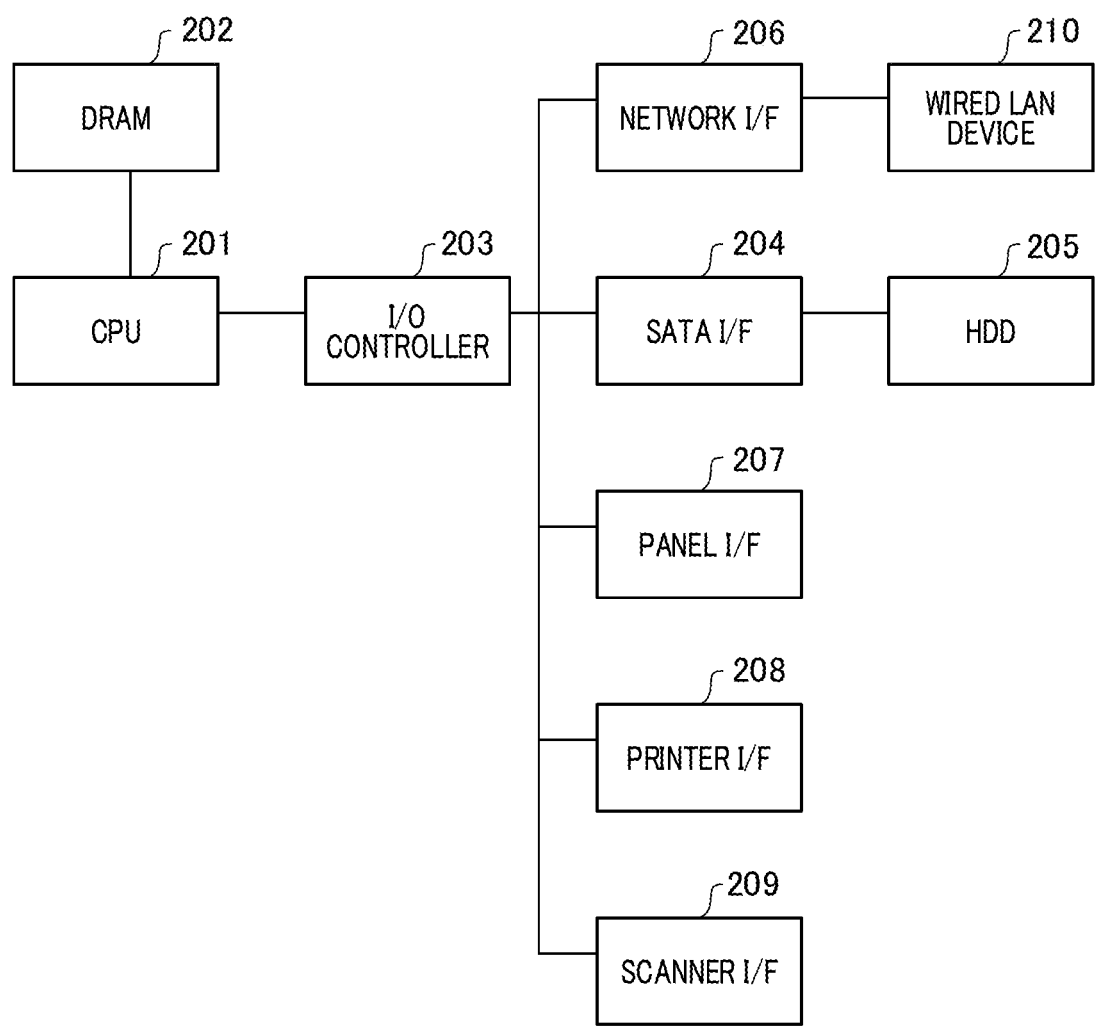
FIG. 2 is a block diagram schematically illustrating the hardware configuration of a controller unit disposed in a printing apparatus according to an embodiment.

FIG. 2 is a block diagram illustrating the hardware configuration of the controller unit 101 disposed in the MFP 100.

A central processing unit (CPU) 201 performs a primary calculation process inside the controller. This CPU 201 is connected to a dynamic random access memory (DRAM) 202 and an I/O controller 203 through a bus.

The DRAM 202 is a work memory used for temporarily arranging data used by the CPU 201 in the process of calculation, in other words, program data that is a calculation command and data that is a target for a calculation process.

The I/O controller 203 performs data input/output for various devices in accordance with an instruction of the CPU 201.

A serial advanced technology attachment (SATA) I/F 204 is an interface used for connection with the I/O controller 203 and a hard disk drive (HDD) 205.

The HDD 205 is used for permanently storing a program for realizing the function of the MFP 100, document data read from the scanner unit 104, and the like.

A network I/F 206 is an interface used for connection with the I/O controller 203 and a wired LAN device 210.

The wired LAN device 210 realizes communication through the LAN 150 on the basis of control of the CPU 201.

A panel I/F 207 is an interface used for connecting the I/O controller 203 and the operation unit 102. The CPU 201 controls the operation unit 102 through this panel I/F 207, whereby input of information from a user and output of information to a user are realized.

A printer I/F 208 is an interface used for connecting the I/O controller 203 and the printer unit 103. The CPU 201 controls the printer unit 103 through this printer I/F 208, whereby an output process for a paper medium or the like is realized.

The scanner I/F 209 is an interface used for connecting the I/O controller 203 and the scanner unit 104. The CPU 201 controls the scanner unit 104 through this scanner I/F 209, whereby a process of reading a document is realized.

Figure 3:
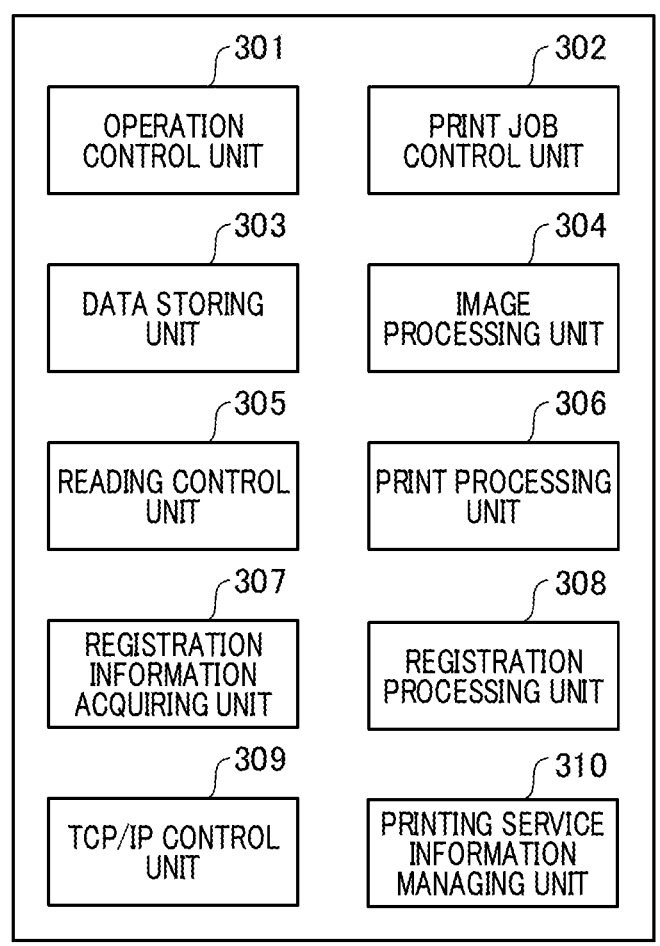
FIG. 3 is a block diagram schematically illustrating the software configuration of a controller unit disposed in a printing apparatus according to an embodiment.

FIG. 3 is a block diagram illustrating the software configuration of the controller unit 101 disposed in the MFP 100. Each constituent unit illustrated in FIG. 3 is built by the CPU 201 reading a program stored in the HDD 205 into the DRAM 202 and executing the read program. Although a case in which control of each module illustrated in FIG. 3 and each process illustrated in a flowchart to be described below are executed by one CPU 201 using one memory (the DRAM 202) is illustrated for the description of in this embodiment, another form may be employed. For example, control of each module and each process illustrated in a flowchart to be described below may be executed by incorporating a plurality of processors, a RAM, a ROM, and a storage.

An operation control unit 301 executes a process of displaying a user dedicated screen image in the operation unit 102 or detects a user's operation on a screen component (a button or the like) displayed on a screen and executes a process corresponding to the operation. In other words, the operation control unit 301 functions as a display unit that presents information to a user and an acceptance unit that accepts a user operation.

A print job control unit 302 controls execution of a print job in accordance with print job data received from the client terminal 120 through a TCP/IP control unit 309 (to be described below). In addition, the print job control unit 302 holds information of print conditions (in other words, information relating to printing capability of the MFP 100) that can be set and provides this information in accordance with an instruction from another control unit.

A data storing unit 303 performs control of storing data in the HDD 205 and control of reading data from the HDD 205 in accordance with a request from another control unit. For example, in a case in which a user changes a certain device setting, when the user performs an operation of a setting change using the operation unit 102, the operation control unit 301 detects the setting change and requests the data storing unit 303 to store the setting change in the HDD 205.

An image processing unit 304 processes image data into an appropriate format that is appropriate for a designated use and the like in accordance with an instruction from the print job control unit 302.

A reading control unit 305 is connected to the scanner unit 104 through the scanner I/F 209. The reading control unit 305 performs a process of reading a document disposed on a document stand and the like by controlling the scanner unit 104.

A print processing unit 306 is connected to the printer unit 103 through the printer I/F 208. The print processing unit 306 performs a process of printing an image on a paper medium and outputting the paper medium and the like by controlling the printer unit 103 in accordance with an instruction from the print job control unit 302.

A registration information acquiring unit 307 acquires information of the MFP 100 to be registered in the DNS server 110 from the data storing unit 303 and a printing service information managing unit 310 (to be described below) in accordance with an instruction from a registration processing unit 308 (to be described below) and delivers the acquired information to the registration processing unit 308.

The registration processing unit 308 acquires the information of the MFP 100 from the registration information acquiring unit 307 and converts the acquired information into a format of name resolution information registered in a DNS server. Then, the registration processing unit 308 generates a DNS registration request packet in which this name resolution information is stored and instructs a TCP/IP control unit 309 to transmit the generated DNS registration request packet to the DNS server 110 as a DNS registration request. In addition, the registration processing unit 308 generates a DNS registration deletion request packet as will be described below and instructs the TCP/IP control unit 309 to transmit the generated DNS registration deletion request packet to the DNS server 110 as a DNS registration deletion request.

The TCP/IP control unit 309 performs the process of transmitting/receiving network packets to/from the DNS server 110 or the client terminal 120 through the network I/F 206 in accordance with an instruction from another control unit.

The printing service information managing unit 310 acquires setting information of a device name, a host name, and the like from the data storing unit 303. Then, the printing service information managing unit 310 generates and holds printing service information 1001 (see FIG. 10 to be described below) provided by the MFP 100 on the basis of the setting information. In addition, the printing service information managing unit 310 provides this printing service information 1001 in accordance with a request from another control unit.

For example, in a case in which a printing function is executed, when a print job request and document data are received, the TCP/IP control unit 309 instructs the print job control unit 302 to perform printing. The print job control unit 302 causes the image processing unit 304 to perform the process of converting an image of document data into a format that is appropriate for printing on the basis of the received print job request. Then, the print job control unit 302 instructs the print processing unit 306 to perform printing and output a print result.

Figure 4:
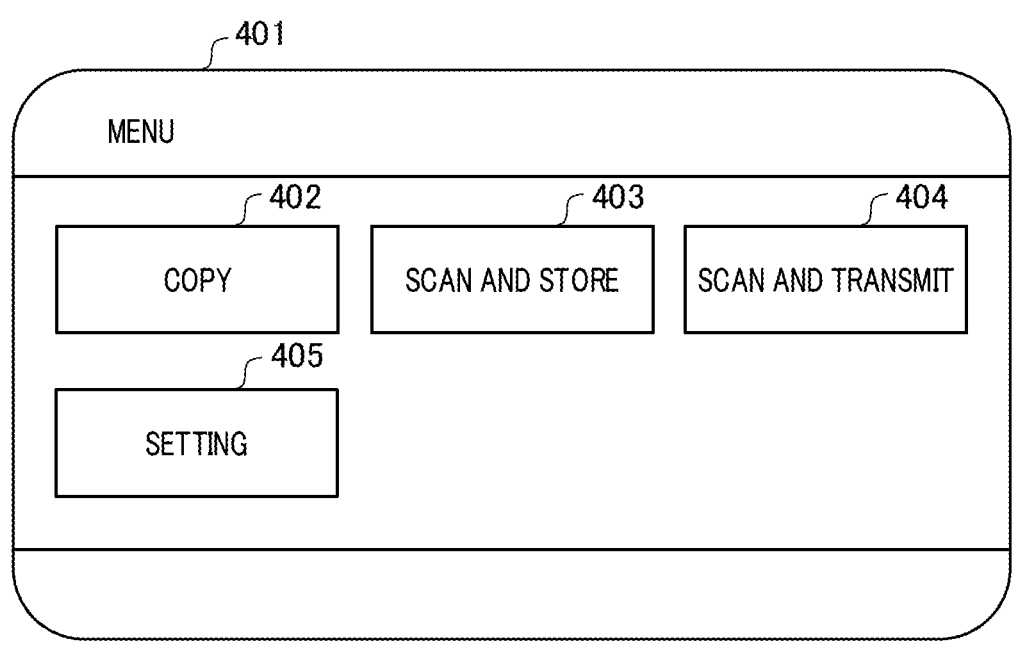
FIG. 4 is a conceptual diagram illustrating a setting screen of a printing apparatus according to an embodiment.

FIG. 4 illustrates a menu screen 401 that is displayed in the operation unit 102. This menu screen 401 is used for allowing a user to instruct execution of various functions included in the MFP.

A button 402 is used for allowing a user to instruct execution of a copy function.

A button 403 is used for allowing a user to instruct execution of a function of scanning a document and storing scan data.

A button 404 is used for instructing a user to execute a function of scanning a document and directly transmitting scan data.

A button 405 is used when a user desires to execute a setting change of a device. When a pressing operation is performed on the button 405, a setting screen 501 can be displayed.

Figure 5:
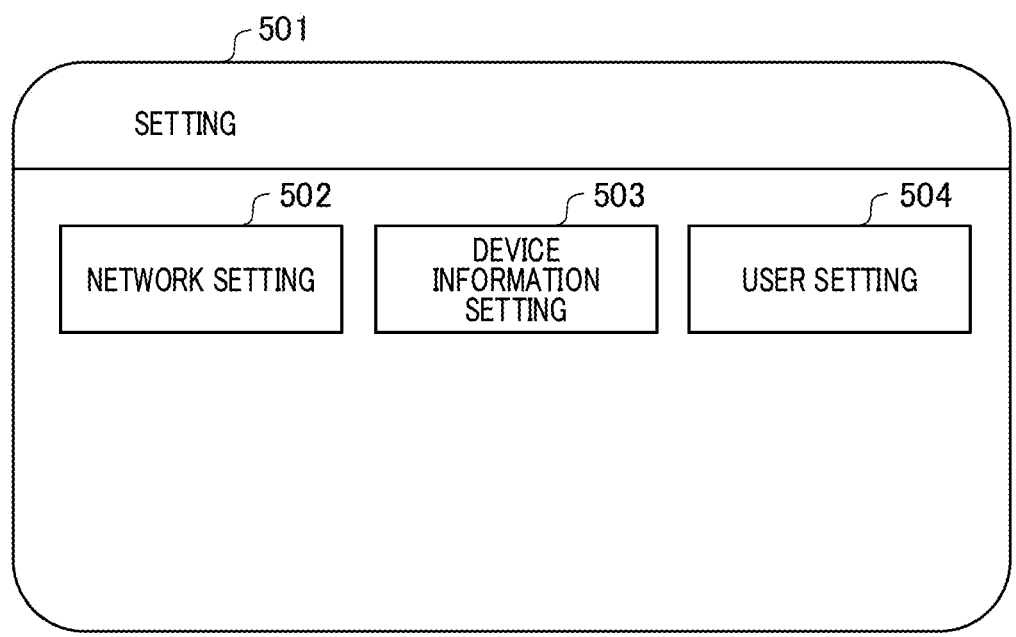
FIG. 5 is a conceptual diagram illustrating a setting screen of a printing apparatus according to an embodiment.

FIG. 5 illustrates the setting screen 501 displayed in the operation unit 102. This setting screen 501 is used for allowing a user to perform various settings. However, specific setting items are not displayed on this setting screen 501, and this setting screen is an intermediate layer for guiding a user to a detailed setting item.

A button 502 is used for displaying a network setting screen 601 (see FIG. 6 described below) in the operation unit 102.

A button 503 is used for displaying a device information setting screen 901 (see FIG. 9 to be described below) in the operation unit 102.

A button 504 is used for displaying a user setting screen not illustrated in the drawing in the operation unit 102.

Figure 6:
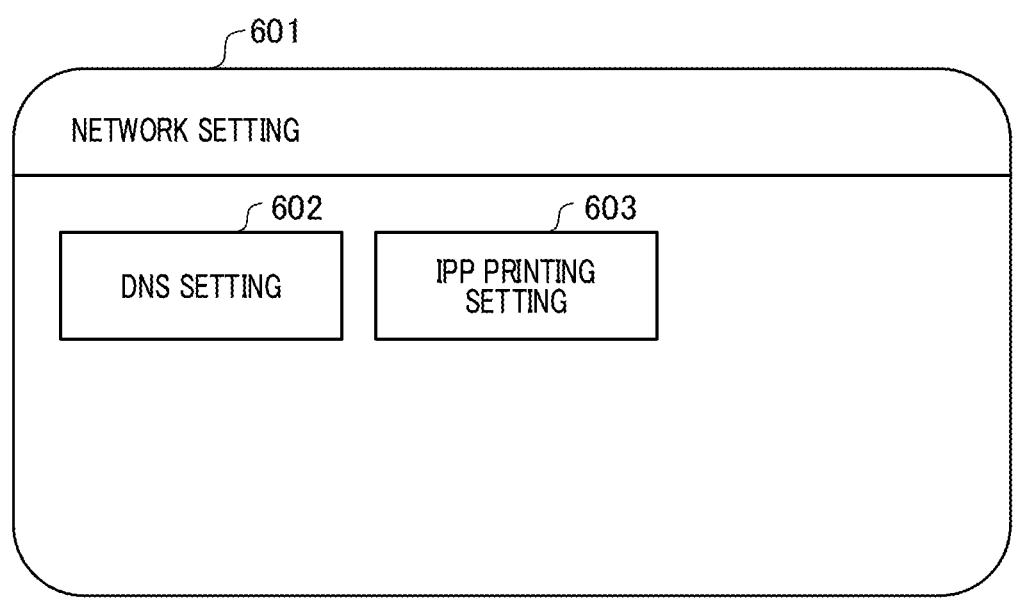
FIG. 6 is a conceptual diagram illustrating a setting screen of a printing apparatus according to an embodiment.

FIG. 6 illustrates a network setting screen 601 displayed in the operation unit 102. This network setting screen 601 is used for allowing a user to perform various network settings. However, specific setting items are not displayed on this network setting screen 601, and the network setting screen 601 is an intermediate layer for guiding the user to a detailed setting item.

A button 602 is used for displaying a DNS setting screen 701 (see FIG. 7 to be described below) in the operation unit 102.

A button 603 is used for displaying an IPP setting screen 801 (see FIG. 8 to be described below) in the operation unit 102.

Figure 7:
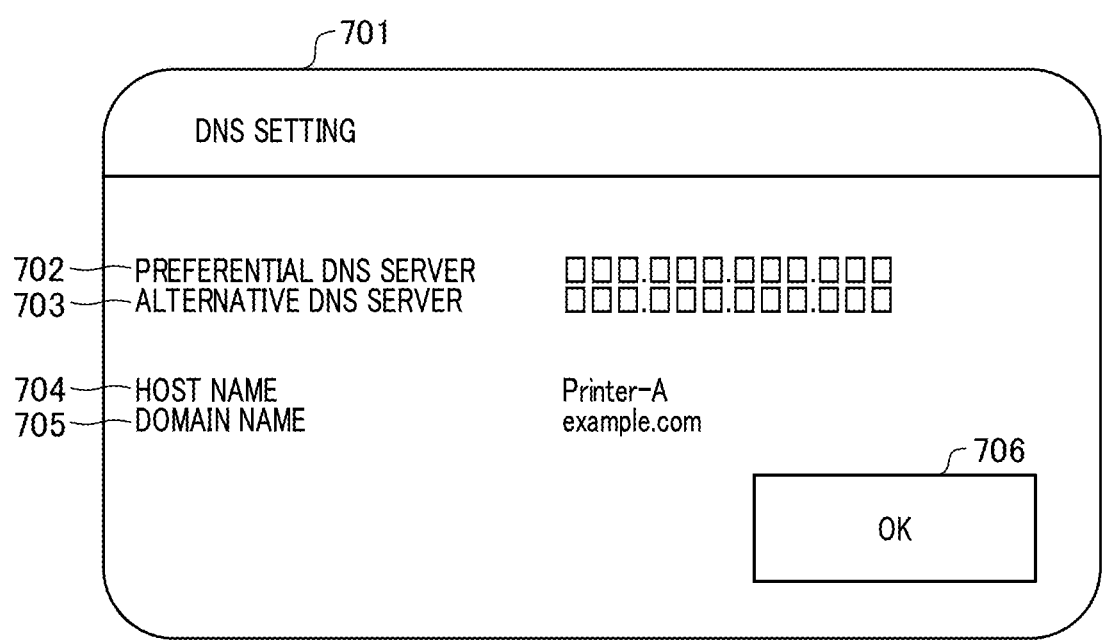
FIG. 7 is a conceptual diagram illustrating a setting screen of a printing apparatus according to an embodiment.

FIG. 7 illustrates a DNS setting screen 701 displayed in the operation unit 102.

On this DNS setting screen 701, a preferential DNS server input section 702 and an alternative DNS server input section 703 are input fields for a user to input IP addresses of arbitrary DNS servers.

A host name input section 704 is an input field for inputting a host name to be registered in a DNS server.

A domain name input section 705 is an input field for inputting a domain name to be registered in the DNS server.

A button 706 is used for storing items input on the DNS setting screen 701 in the data storing unit 303. When the storage in the data storing unit 303 ends, the display of the operation unit 102 returns to the network setting screen 601.

Figure 8:
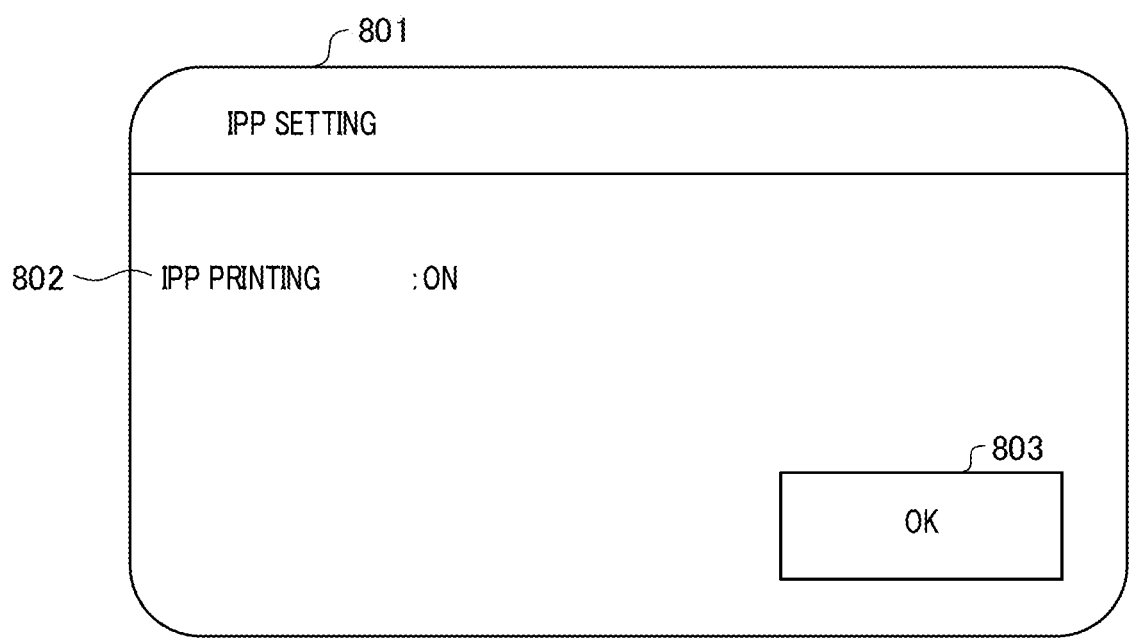
FIG. 8 is a conceptual diagram illustrating a setting screen of a printing apparatus according to an embodiment.

FIG. 8 illustrates an IPP setting screen 801 that is displayed in the operation unit 102.

An IPP printing setting area 802 is used for designating on/off of an IPP printing function. A user can switch the IPP printing function on/off by performing an operation for the area 802. When a user operation in the area 802 is detected, the CPU 201 displays a pop up screen not illustrated in the drawing. The user can change the setting of the IPP printing function to "on" or "off" through the pop up screen. Here, "on" is a setting for activating the IPP printing function, and "off" is a setting for deactivating the IPP printing function.

A button 803 is a button used for storing an item input on the IPP setting screen 801 in the data storing unit 303. When the button 803 is pressed, the setting relating to the IPP printing function that has been changed on the basis of a user operation is stored in the data storing unit 303. When the storage is completed, the network setting screen 601 is displayed in the operation unit 102.

Figure 9:
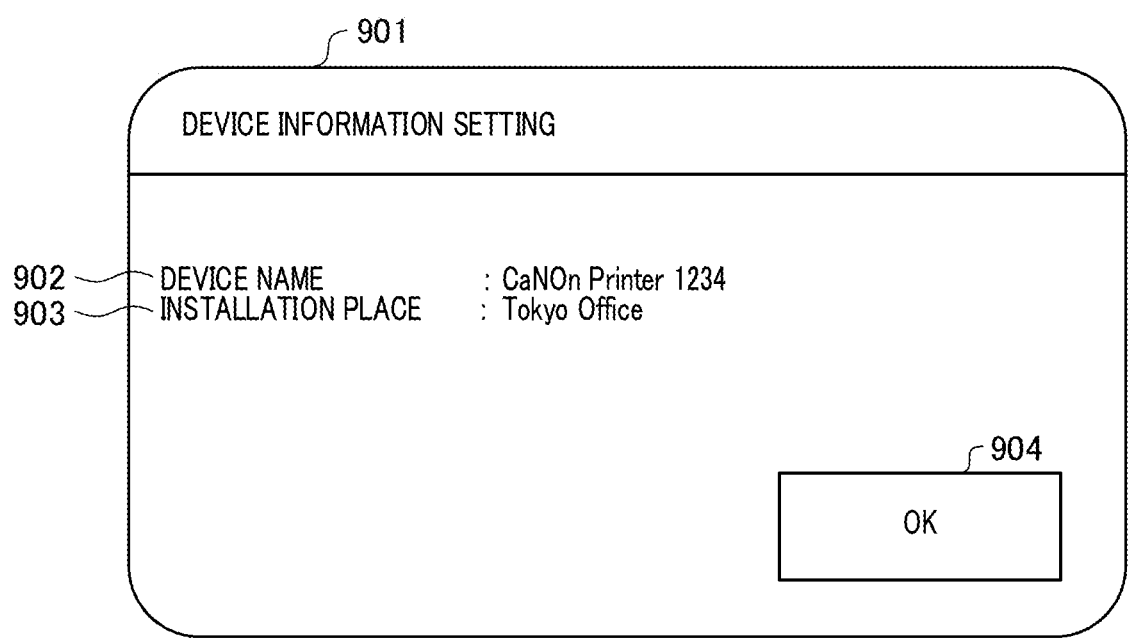
FIG. 9 is a conceptual diagram illustrating a setting screen of a printing apparatus according to an embodiment.

FIG. 9 illustrates a device information setting screen 901 displayed in the operation unit 102.

A device name input section 902 is an input field used for a user to input an arbitrary character string as a device name.

An installation place input section 903 is an input field used for a user to input an arbitrary character string as an installation place of an MFP.

A button 904 is a button used for storing items input on the device information setting screen 901 in the data storing unit 303. When the button 904 is operated to be pressed, the setting screen 501 is displayed in the operation unit 102.

FIG. 10 is an example of IPP printing service information that is held by the printing service information managing unit 310. The MFP 100 according to this embodiment has a function of providing an IPP printing service.

The IPP printing service information 1001 represents IPP printing capability information and includes information required for the client terminal 120 to determine whether or not the MFP 100 corresponds to an IPP printing service. More specifically, the IPP printing service information 1001 includes print protocol identification information 1002, device information 1003, printing service detailed information 1004, and a printing service type 1005.

The print protocol identification information 1002 is information that represents a communication protocol of an IPP printing service.

The device information 1003 corresponds to setting information on the device information setting screen 901 and includes a device name (row "ty"), a product name (row "product"), and an installation place (row "note").

The printing service detailed information 1004 is information relating to an IPP printing function of the MFP 100.

The row "adminurl" represents a URL of a web page used for settings relating to IPP printing.

A row "pdl" represents a page description language that can be processed.

A row "Color" is a character string representing presence/absence of a color printing function, "T" is stored therein in the case of the presence of the function, and "F" is stored therein in the case of the absence of the function.

A row "Copies" is a character string that represents presence/absence of a number of copies printing function, "T" is stored in the case of the presence of the function, and "F" is stored therein in the case of the absence of the function.

A row "Duplex" is a character string that represents presence/absence of the function of a duplex printing function, "T" is stored in the case of the presence of the function, and "F" is stored in the case of the absence of the function.

A row "Bind" is a character string that represents presence/absence of a binding function, "T" is stored in the case of the presence of the function, and "F" is stored in the case of the absence of the function.

A row "Collate" is a character string that represents presence/absence of a recording function, "T" is stored in the case of the presence of the function, and "F" is stored in the case of the absence of the function.

A row "Sort" is a character string that represents presence/absence of a sorting function, "T" is stored in the case of the presence of the function, and "F" is stored in the case of the absence of the function.

A row "Staple" is a character string that represents presence/absence of a stapling function, "T" is stored in the case of the presence of the function, and "F" is stored in the case of the absence of the function.

A row "Puncher" is a character string that represents the number of holes that can be formed using a puncher function. In an MFP 100 having no puncher function, "0" is stored.

As a printing service type 1005, "_ipp._tcp" representing a printing service according to the IPP is stored.

Figure 11:
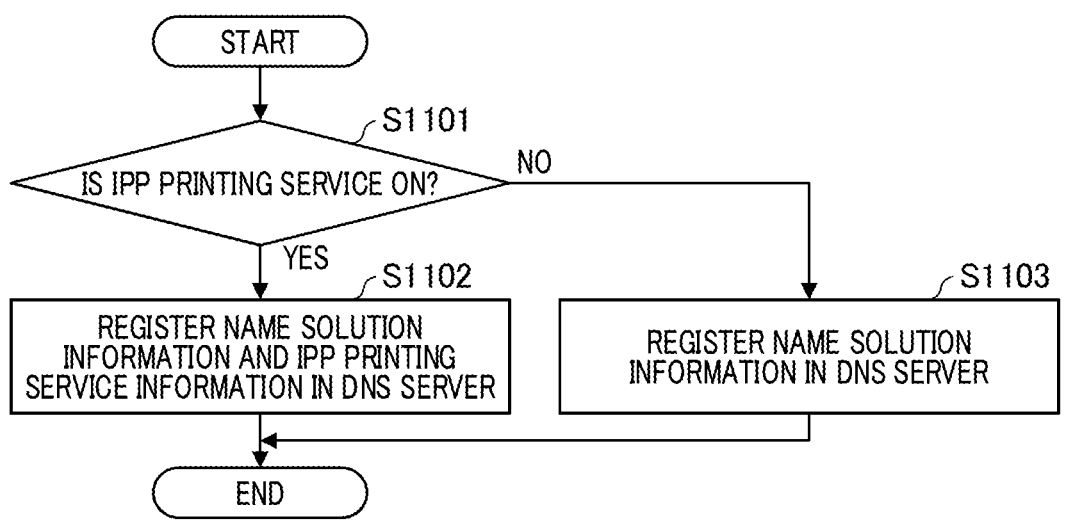
FIG. 11 is a flowchart illustrating operations of a printing apparatus according to an embodiment.

FIG. 11 is a flowchart illustrating a process performed by the registration processing unit 308 (see FIG. 3) of the MFP 100 in a case in which a DNS registration packet is transmitted to the DNS server 110.

The entire process of FIG. 11 is performed by the CPU 201 reading a program stored in the HDD 205 into the DRAM 202 and executing the program. FIG. 11 is an example of a case in which the MFP 100 requests the DNS server 110 to register a DNS at the time of starting. For example, when a power button not illustrated in the drawing is detected to have been pressed in a state in which power is not supplied to each unit of the MFP 100, a start up sequence of the MFP 100 is executed. In the start up sequence, a booting process of reading an OS, a start up process of causing each of functions such as copying and printing to be in an executable state by supplying power to each unit, and the like are performed. In this start up sequence, a DNS registration process is performed as one process. The DNS registration process that is one process in the start up sequence will be described with reference to FIG. 11.

When start up of the MFP 100 is detected, the registration processing unit 308 of the MFP 100 starts the process of registering device information in the DNS server 110.

First, in Step S1101, the registration processing unit 308 acquires an on/off setting of the IPP printing function by referring to the data storing unit 303. As described above, the on/off setting of the IPP printing function is set by a user using the IPP setting screen 801. The registration processing unit 308 executes Step S1102 in a case in which the setting is on and executes Step S1103 in a case in which the setting is off.

In Step S1102, the registration processing unit 308 instructs the registration information acquiring unit 307 to acquire a host name of a device, a domain name, and IPP printing service information as information to be registered in the DNS server 110.

When this instruction is accepted, the registration information acquiring unit 307 acquires a host name and a domain name set on the DNS setting screen 701 by referring to the data storing unit 303 and provides the host name and the domain name that have been acquired for the registration processing unit 308. In addition, the registration information acquiring unit 307 acquires IPP printing service information 1001 from the printing service information managing unit 310 and provides the acquired IPP printing service information for the registration processing unit 308.

The registration processing unit 308 generates name resolution information from the host name and the domain name that have been supplied, stores the generated name resolution information in a DNS registration request packet (see FIGS. 12 and 13 to be described below) together with the IPP printing service information, and transmits the DNS registration request packet to the DNS server 110. In other words, a registration request packet in which the name resolution information and the IPP printing service information are associated is transmitted to the DNS server 110. When this DNS registration request packet is received, the DNS server 110 extracts the name resolution information and the IPP printing service information and registers them as DNS information of the MFP 100.

Meanwhile, in Step S1103, the registration processing unit 308 instructs the registration information acquiring unit 307 to acquire a host name and a domain name of a device as information to be registered in the DNS server.

When this instruction is received, the registration information acquiring unit 307 acquires the host name and the domain name set on the DNS setting screen 701 by referring to the data storing unit 303 and provides the host name and the domain name that have been acquired for the registration processing unit 308.

The registration processing unit 308 generates name resolution information from the host name and the domain name that have been supplied, stores the generated name resolution information in a DNS registration request packet (see FIG. 14 to be described below), and transmits the DNS registration request packet to the DNS server 110. When this DNS registration request packet is received, the DNS server 110 extracts name resolution information and registers the extracted name resolution information as DNS information of the MFP 100.

FIGS. 12 and 13 illustrate a DNS registration request packet 1201 generated by the registration processing unit 308 in Step S1102 described above. After being generated in Step S1102, this DNS registration request packet is transmitted from the MFP 100 to the DNS server 110.

As illustrated in FIGS. 12 and 13, the DNS registration request packet 1201 includes an A record 1202, a PTR record 1203, an SRV record 1204, and a TXT record 1205.

Each record of the DNS registration request packet 1201 includes various parameters. Such parameters are set by the registration processing unit 308. Such parameters are parameters generated on the basis of information acquired from the data storing unit 303 and the printing service information managing unit 310, fixed parameter set in advance, and the like.

The A record 1202 is name resolution information. The example of FIG. 12 illustrates that a fully qualified domain name (FQDN) of the MFP 100 is "Printer A.example.com", and an IP address corresponding to this FQDN is "10.20.20.20".

A parameter "Name" of the A record 1202 is set on the DNS setting screen 701 and is generated by combining a host name and a domain name stored in the data storing unit 303. In a case in which a domain name has not been set on the DNS setting screen 701, a host name is used as the parameter "Name".

A parameter "Address" of the A record 1202 is a value of an IP address assigned to the MFP 100.

The PTR record 1203 is information representing a service type and a service name. The example of FIG. 12 illustrates that a service type is "_ipp.tcp.example.com.", and a service name is "Printer A._ipp.tcp.example.com".

In other words, in the PTR record 1203, the parameter "Name" represents a service type. This parameter "Name" is generated by combining a printing service type 1005 and a domain name. As described above, the printing service type 1005 is included in the IPP printing service information 1001 acquired from the printing service information managing unit 310, and the domain name is set on the DNS setting screen 701 and is stored in the data storing unit 303.

Meanwhile, a parameter "Domain Name" of the PTR record 1203 represents a service name. The parameter "Domain Name" is a combination of a host name and a domain name that are set on the DNS setting screen 701 and are acquired from the data storing unit 303 and a printing service type 1005. In a case in which a domain name has not been set on the DNS setting screen 701, the parameter "Domain Name" is generated by combining a host name and a printing service type 1005.

The SRV record 1204 represents that an FQDN of a host providing a service name "Printer A._ipp.tcp.example.com" is "Printer A.example.com". In addition, the SRV record 1204 represents that the service port number is "631".

As a parameter "Name" of the SRV record 1204, a service name set to the parameter "Domain Name" of the PTR record 1203 is set.

Meanwhile, as a parameter "Port" of the SRV record 1204, a network port number used for the IPP printing service is set.

As a parameter "Target" of the SRV record 1204, similar to the parameter "Name" of the A record 1202, an FQDN of the MFP 100 is set.

In the TXT record 1205, information associated with a host of "Printer A.example.com" set as the FQDN is listed as TXT parameters.

As a TXT Length parameter, a data length of each TXT parameter is set. In the TXT record 1205 according to this embodiment, print protocol identification information 1002, device information 1003, and printing service detailed information 1004 are listed in the format of TXT parameters.

FIG. 14 illustrates a DNS registration request packet 1301 that is generated by the registration processing unit 308 in Step S1103 described above. This DNS registration request packet 1301 is generated in Step S1103 and then is transmitted from the MFP 100 to the DNS server 110. As described above, the DNS registration request packet 1301 generated in Step S1103 does not include the IPP printing information, which is different from the DNS registration request packet 1201 generated in Step S1102.

For this reason, the DNS registration request packet 1301 includes only an A record 1302 without including a PTR record, an SRV record, and a TXT record. In other words, in Step S1103, only information representing that the IP address of "Printer A.example.com" that is an FQDN assigned to the MFP 100 is "10.20.20.20" is registered in the DNS server 110.

Figure 15:
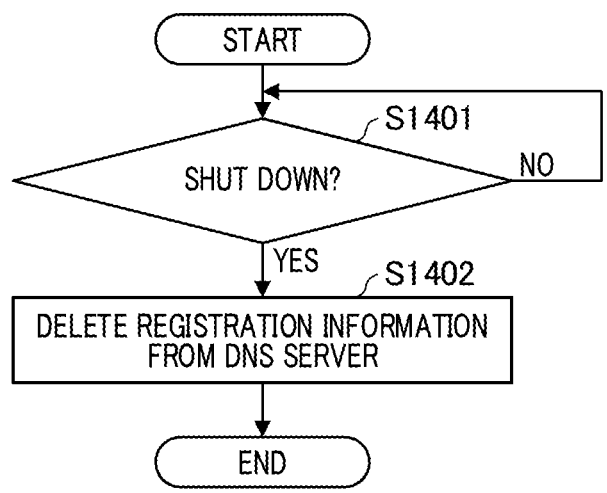
FIG. 15 is a flowchart illustrating operations of a printing apparatus according to an embodiment.

FIG. 15 is a flowchart illustrating a process performed by the registration processing unit 308 (see FIG. 3) of the MFP 100 in a case in which a DNS registration deletion request packet is transmitted to the DNS server 110.

The entire process of FIG. 15 is performed by the CPU 201 reading a program stored in the HDD 205 into the DRAM 202 and executing the program. FIG. 15 is an example of a case in which the MFP 100 transmits a DNS registration deletion request to the DNS server 110 at the time of shutdown thereof.

In Step S1401, the registration processing unit 308 checks whether or not the MFP 100 has started a shutdown process. Then, when the start of the shutdown process is detected, the registration processing unit 308 executes Step S1402. The shutdown process is, for example, executed by being triggered upon user's pressing of a power button not illustrated in the drawing or elapse of a predetermined time after a transition of the MFP 100 to a power save state.

In Step S1402, the registration processing unit 308 generates a registration deletion request packet (see FIG. 16 to be described below) of device information and transmits the generated registration deletion request packet to the DNS server 110. When this registration deletion request packet is received, the DNS server 110 deletes corresponding registration information.

FIG. 16 illustrates a DNS registration deletion request packet 1501 generated by the registration processing unit 308 in Step S1402. This DNS registration deletion request packet 1501 is generated in Step S1402 and then is transmitted from the MFP 100 to the DNS server 110.

As illustrated in FIG. 16, in the DNS registration deletion request packet 1501, "ANY" is set to a parameter "Class" of each record that is a deletion target. In addition, "0" is set to a parameter "Time to live" and a parameter "Data Length". In accordance with this, a deletion request for the record information is represented. In the example of FIG. 16, the deletion request is performed in association with the A record 1202, the PTR record 1203, the SRV record 1204, and the TXT record 1205 included in the DNS registration request packet 1201 (see FIGS. 12 and 13).

Figure 17:
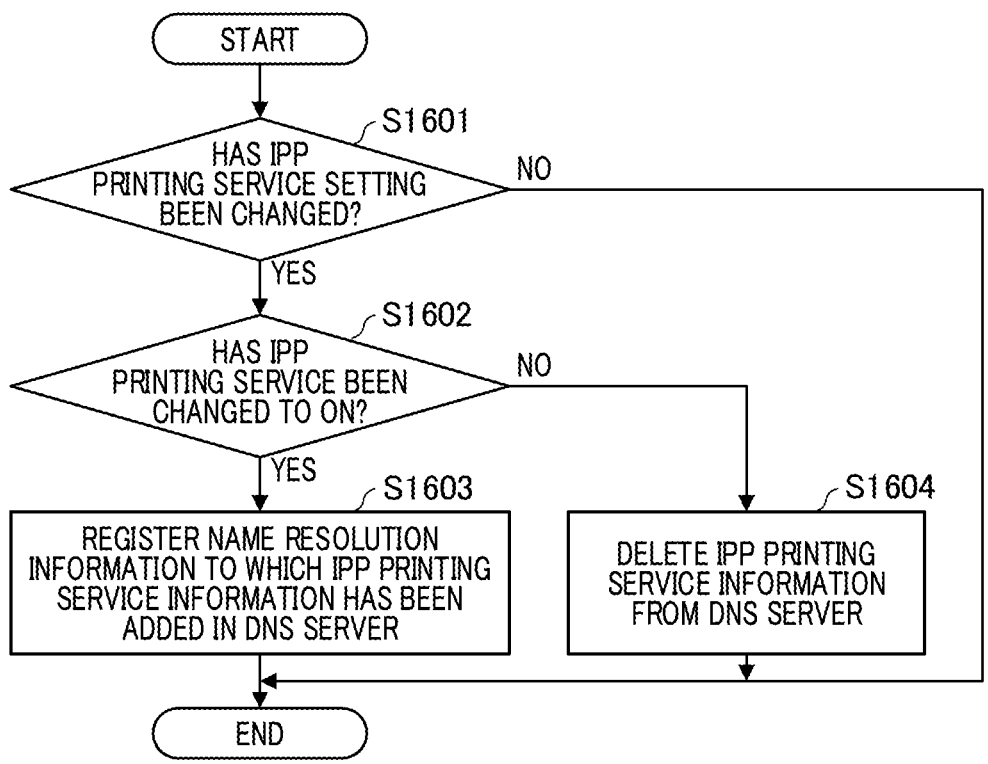
FIG. 17 is a flowchart illustrating operations of a printing apparatus according to an embodiment.

FIG. 17 is a flowchart illustrating a process of updating the DNS registration information stored in the DNS server 110.

The process illustrated in FIG. 17 is performed by the CPU 201 of the MFP 100 reading a program stored in the HDD 205 into the DRAM 202 and executing the program in a case in which the IPP setting (see FIG. 8) is changed during the operation of the MFP 100.

When the registration processing unit 308 detects a pressing operation of the button 803 on the IPP setting screen 801, Step S1601 is executed.

In Step S1601, the registration processing unit 308 acquires an IPP printing service setting by referring to the data storing unit 303 and determines whether or not the on/off setting of the IPP printing has been changed. In a case in which the setting has been changed, the registration processing unit 308 executes Step S1602. On the other hand, in a case in which the setting has not been changed, the registration processing unit 308 ends the process.

In Step S1602, the registration processing unit 308 determines whether the setting of the IPP printing after change is "on" or "off". In a case in which the setting after change is "on", the registration processing unit 308 executes Step S1603. On the other hand, in a case in which the setting after change is "off", Step S1604 is executed.

In Step S1603, the registration processing unit 308 generates a DNS registration request packet 1201 as described above and transmits the generated DNS registration request packet 1201 to the DNS server. In accordance with this, the name resolution information of the MFP 100 and the IPP printing service information are updated and registered in the DNS server 110.

In Step S1604, the registration processing unit 308 generates a DNS registration deletion request packet 1701 (see FIG. 18 to be described below) and transmits the generated DNS registration deletion request packet 1701 to the DNS server 110. In accordance with this, the IPP printing service information of the MFP 100 is deleted from the DNS server 110.

FIG. 18 illustrates the DNS registration deletion request packet 1701 generated in Step S1604. The DNS registration deletion request packet 1701 is transmitted by the MFP 100 to the DNS server 110 for deleting the IPP printing service information. The DNS registration deletion request packet 1701 requests deletion of the PTR record, the SRV record, and the TXT record but does not request deletion of the A record. For this reason, only the IPP printing service information of the MFP 100 is deleted from the DNS server 110, and the name resolution information is not deleted.

Figure 19:
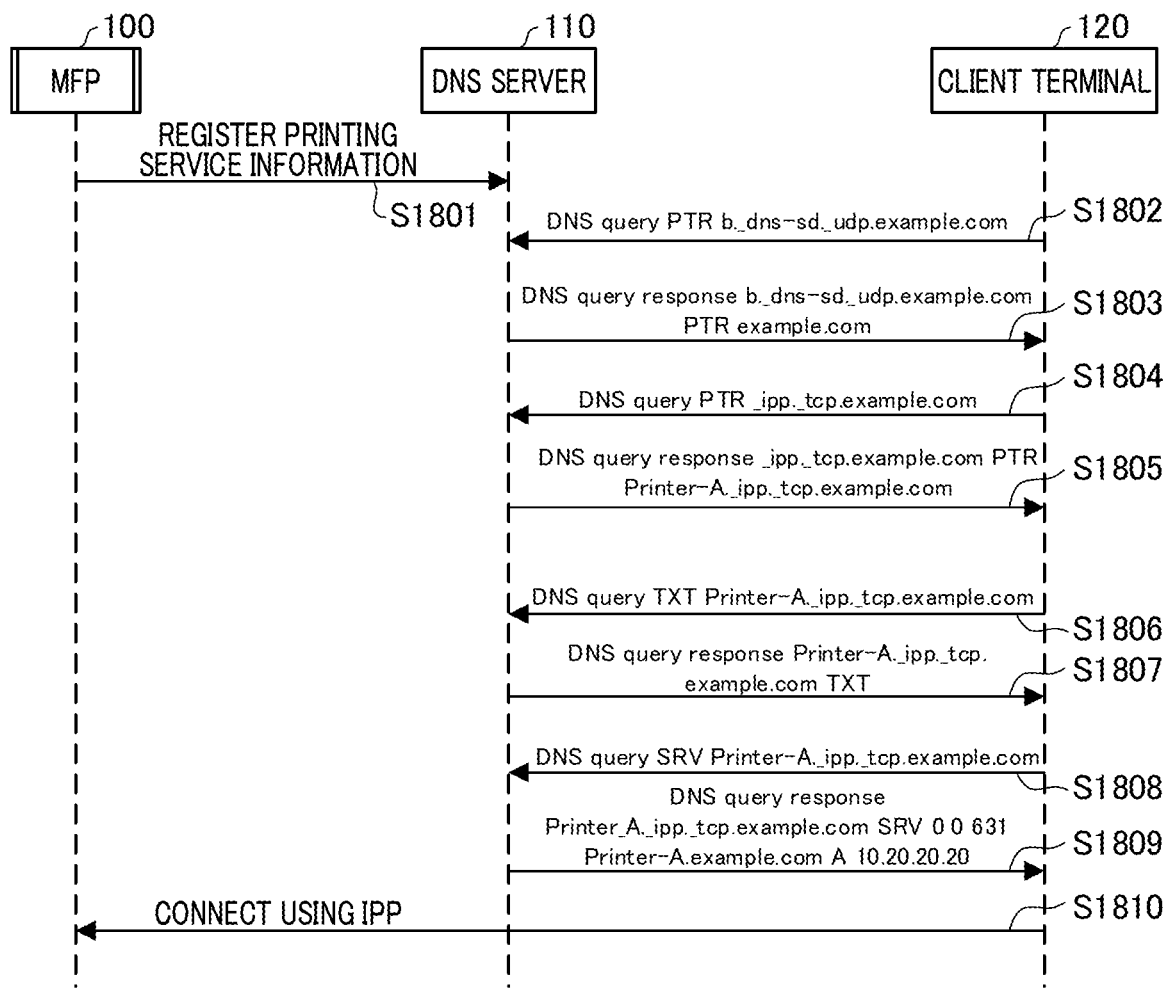
FIG. 19 is a sequence diagram illustrating an operation sequence of a system according to an embodiment.

FIG. 19 is a diagram illustrating the sequence of a process of the client terminal 120 searching for the MFP 100 providing an IPP printing service using a DNS SD technology.

The MFP 100 transmits a DNS registration request packet 1201 (see FIGS. 12 and 13) to the DNS server 110 in advance (S1801). The DNS server 110 that has received the DNS registration request packet 1201 registers search information such that the MFP 100 can be retrieved from the client terminal of the IPP on the basis of the name resolution information and the IPP printing service information of the MFP 100.

In order to inquire about a domain to be referred to using the DNS SD technology, the client terminal 120 transmits a DNS query "DNS query PTR b._dns sd._udp.example.com" to the DNS server 110 (S1802).

When this DNS query is received, the DNS server 110 transmits "DNS query PTR b._dns sd._udp.example.com PTR example.com" to the client terminal 120 (S1803). In accordance with this response, a domain to be referred to is instructed.

The client terminal 120 transmits a DNS query representing a service type of a search target to the DNS server 110 (S1804). This DNS query includes a text string "ipp._tcp.example.com". This character string is formed by "ipp._tcp" that representing a printing service and "example.com" that is a domain name designated by a response 1803. In accordance with this character string, a service type of a search target is designated.

The DNS server 110 returns "Printer A._ipp._tcp.example.com" as a service name of a host providing the service type designated by this DNS query (S1805).

The client terminal 120 transmits a DNS query "DNS query TXT Printer A._ipp._tcp.example.com" to the DNS server 110 (S1806).

The DNS server 110 responses to the client terminal 120 with a TXT record 1205 that is registered in association with the IPP printing service "Printer A._ipp._tcp.example.com" (S1807). In accordance with this, the client terminal 120 acquires the IPP printing service information corresponding to the service name received in S1805 described above.

The client terminal 120 transmits a DNS query "DNS query SRV Printer A._ipp._tcp.example" used for inquiring about an SRV record to the DNS server 110 (S1808).

The DNS server 110 performs a response that includes the SRV record and the A record of the IPP printing service "Printer A._ipp._tcp.example.com" (S1809). In other words, the DNS server 110 transmits "Printer A._ipp._tcp.example.com SRV 0 0 631 Printer A.example.com A 10.20.20.20" to the client terminal 120.

In accordance with this, the client terminal 120 acquires an FQDN and a service port of a host that provides an IPP printing service "Printer A._ipp._tcp.example.com".

As above, the client terminal 120 can solve the IP address and the service port number of the MFP 100 that provides the IPP printing service. As a result, the client terminal 120 can perform connection to the MFP 100 in compliance with the IPP and accordingly, can transmit a desired job to this MFP 100 (S1810).

Figure 20:
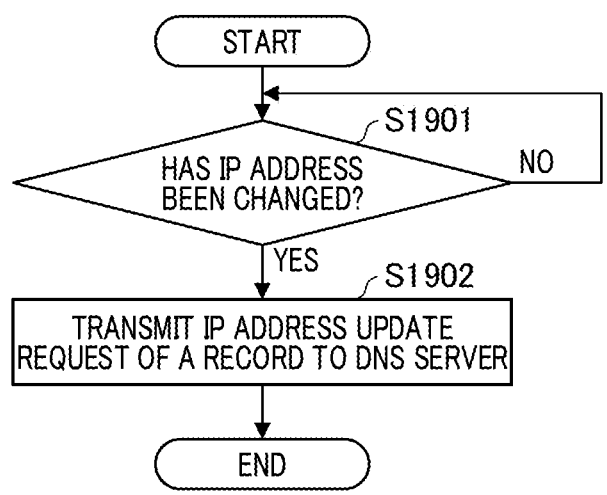
FIG. 20 is a flowchart illustrating operations of a printing apparatus according to an embodiment.

FIG. 20 is a flowchart illustrating a process of a case in which an IP address set to the MFP 100 has been changed. In this process, the MFP 100 transmits a packet for requesting update of DNS registration details to the DNS server 110.

The entire process of FIG. 20 is performed by the CPU 201 reading a program stored in the HDD 205 into the DRAM 202 and executing the program.

In Step S1901, the registration processing unit 308 detects whether or not the IP address set to the MFP 100 has been changed. In a case in which a change has been detected, the registration processing unit 308 executes Step S1902.

In Step S1902, the registration processing unit 308 generates a packet (an update request packet) having the same format as the DNS registration request packet 1301 illustrated in FIG. 14 as a packet used for requesting update of an IP address. At that time, a new IP address is set to the parameter "Address" of the A record 1302. By transmitting this packet to the DNS server 110, an IP address included in the A record in the device information registered in the DNS server 110 is updated.

As described above, according to this embodiment, by allowing the client terminal 120 to search for an MFP 100 providing an IPP printing service using the DNS server, the client terminal can be allowed to receive a printing service. For this reason, according to this embodiment, the MFP 100 or the client terminal 120 does not need to have a near field communication function or a search function using the mDNS, and accordingly, a printing service having versatility can be provided at low cost.

Other Embodiments

An embodiment of the present invention can also be realized by a computer of a system or apparatus that reads out and executes computer executable instructions (e.g., one or more programs) recorded on a storage medium (which may also be referred to more fully as a 'non transitory computer readable storage medium') to perform the functions of one or more of the above described embodiment(s) and/or that includes one or more circuits (e.g., application specific integrated circuit (ASIC)) for performing the functions of one or more of the above described embodiment, and by a method performed by the computer of the system or apparatus by, for example, reading out and executing the computer executable instructions from the storage medium to perform the functions of one or more of the above described embodiment(s) and/or controlling the one or more circuits to perform the functions of one or more of the above described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), digital versatile disc (DVD), or Blu ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-131492, filed Jul. 16, 2019 which is hereby incorporated by reference wherein in its entirety.

What is claimed is:

1. A printing apparatus that communicates with a DNS server through a network, the printing apparatus comprising:
   at least one memory that stores a set of instructions; and
   at least one processor that executes the instructions, the instructions, when executed, causing the printing apparatus to perform operations comprising:
   setting whether a printing service is activated or not as an operation setting of the printing apparatus;
   registering search information, in which capability information provided for a client terminal and information relating to name resolution are associated with each other in the DNS server in accordance with activation of the printing service being set as the operation setting of the printing apparatus; and
   performing a deletion request for the DNS server such that the search information is deleted from the DNS server in accordance with deactivation of the printing service being set as the operation setting of the printing apparatus.

2. The printing apparatus according to claim 1, further comprising a printing device;
   wherein the instructions further include an instruction for performing control of the printing device to print an image on a sheet on the basis of a print job in accordance with reception of the print job corresponding to the printing service from a client terminal.

3. The printing apparatus according to claim 1, wherein, in the registration, it is determined whether or not a setting of activation of the printing service is configured as the operation setting of the printing apparatus, at a power on timing of the printing apparatus, and the search information is registered in the DNS server in a case in which it is determined that the setting of activation of the printing service is configured.

4. The printing apparatus according to claim 1, wherein the instructions further include an instruction for transmitting the deletion request to the DNS server in accordance with reception of an instruction for turning off power of the printing apparatus.

5. The printing apparatus according to claim 1, wherein the instructions further include an instruction for transmitting an update request relating to the search information to the DNS server in a case in which an IP address assigned to the printing apparatus has been updated.

6. The printing apparatus according to claim 1, wherein the capability information at least including PDL type information indicating PDL types that the printing apparatus capable to perform a print processing.

7. The printing apparatus according to claim 1, wherein the capability information is data of a string and is registered with the DNS server as a TXT record.

* * * * *